United States Patent [19]

Marissen et al.

[11] Patent Number: 5,190,809
[45] Date of Patent: Mar. 2, 1993

[54] FABRIC OF THERMOPLASTIC FIBER AND CONTINUOUS REINFORCING FIBER

[75] Inventors: Roelof Marissen, Born; Hans H. H. Hornman, Geleen, both of Netherlands

[73] Assignee: Stamicarbon B.V., Geleen, Netherlands

[21] Appl. No.: 575,475

[22] Filed: Aug. 31, 1990

[30] Foreign Application Priority Data

Aug. 31, 1989 [NL] Netherlands .......................... 8902194

[51] Int. Cl.$^5$ ............................................. B32B 3/00
[52] U.S. Cl. ................................. 428/225; 428/286; 428/288; 428/292; 428/244; 156/148; 156/622
[58] Field of Search ...................... 428/245, 286, 228; 156/622, 148; 11/11

[56] References Cited

U.S. PATENT DOCUMENTS 4,925,729  5/1990  O'Connor ............................ 428/245

Primary Examiner—Patrick J. Ryan
Assistant Examiner—Richard P. Weisberger
Attorney, Agent, or Firm—Cushman, Darby & Cushman

[57] ABSTRACT

Disclosed is a fabric of thermoplastic fibers and continuous reinforcing fibers in which the shrinkage of the thermoplastic fibers is minimal, thus providing a product well-suited for processing as a thermoplastic composite prepreg. The thermoplastic fibers have a melting point lower than that of the reinforcing fibers, and are preheated at a temperature of from 50° to 15° C. below the melting point of the thermoplastic material before being processed to form the fabric.

Fabrics of thermoplastic fibers and reinforcing fibers according to the present invention can be used in applications where sheets of fabrics must be drapeable, so that when subjected to cold forming they conform to the mold for the thermoforming process. Fabrics according to the present invention are especially useful in applications where the use of high-grade, fiber-reinforced plastics is advantageous. Examples of applications include the automotive industry, sporting goods, domestic articles, housings for electronic apparatus, satellite dishes, the aircraft industry, shipbuilding, house construction, furniture, vessels, and helmets.

7 Claims, No Drawings

FABRIC OF THERMOPLASTIC FIBER AND CONTINUOUS REINFORCING FIBER

BACKGROUND OF THE INVENTION

1. Field of the Invention

The present invention relates to a fabric of thermoplastic fibers and continuous reinforcing fibers suited for being processed as a thermoplastic composite prepreg, with the thermoplastic fibers having a melting point lower than that of the reinforcing fibers.

2. Description of the Related Art

A description of how thermoplastic fibers and reinforcing fibers are processed to form a fabric is provided in EP-A-0182.335. The fabric is preferably heated under pressure to beyond the melting point of the thermoplastic material, so that the thermoplastic material will set around the reinforcing fibers and thus form the matrix of the composite product formed. The disadvantage of this prior art process is that during this so-called "thermoforming" of the prepreg, the thermoplastic fibers will shrink, while the absolutely non-shrinking reinforcing fibers, which, before the thermoforming, were substantially stretched and mainly parallel with the thermoplastic fibers in the fabric, have a surplus length and form "loops." Consequently, the mechanical properties of the resulting material are worse than they would be if the reinforcing fibers continued to be substantially stretched.

A process for the reduction of shrinkage problems in synthetic fiber is known from the clothing industry. Among the terms used for the process are annealing or heat-setting. Fibers made for use in clothing are subjected, if so desired, to a pre-shrinkage treatment using steam. Temperatures higher than that of steam are not applied, because, when used, clothing is generally not heated beyond such temperatures.

When the fibers are heated, they will shrink. In the processing of the fabric formed with these fibers, during which processing heat is supplied, the shrinkage is minimal, so that materials with favorable properties are produced.

SUMMARY OF THE INVENTION

It is an object of the present invention to provide a fabric comprising thermoplastic fibers and continuous reinforcing fibers suited for being processed as a thermoplastic composite prepreg.

It is a further object of the present invention to provide a fabric comprising thermoplastic fibers and continuous reinforcing fibers wherein the shrinkage of the thermoplastic fibers is minimal, thus ensuring the production of a fabric possessing the requisite mechanical properties.

It is an additional object of the present invention to provide a process for the production of a fabric comprising thermoplastic fibers and continuous reinforcing fibers wherein the shrinkage of the thermoplastic fibers is minimal.

Accordingly, the present invention provides that the thermoplastic fibers, prior to being processed to form the fabric, are heated and retained for a period of time at a temperature of from 50 to 15.C below the melting point of the thermoplastic material.

Fabrics of thermoplastic fibers and reinforcing fibers according to the present invention can be used in applications where sheets of fabrics must be drapeable, so that when subjected to cold forming they conform to the mold for the thermoforming process. Fabrics according to the present invention are especially useful in applications where the use of high-grade, fiber-reinforced plastics is advantageous.

DESCRIPTION OF THE PREFERRED EMBODIMENTS

The various components comprising the fabric of thermoplastic fibers and reinforcing fibers and the method of preparation therefor of the present invention will be described hereinbelow.

In a first preferred embodiment, the heating and continuous supply of heat is effected with the thermoplastic fibers wound on a reel or bobbin.

This winding is preferably done in a zig-zag winding pattern in order to prevent the fibers from adhering to one another during the heating process. Subsequently, the entire reel can be placed in an oven. It is possible to conduct the oven process under vacuum or in an inert atmosphere, but this is not essential.

When the fibers are wound on a reel, tension is created by the shrinkage during heating, which causes the material to be drawn to virtually the same degree as the shrinkage.

The heating temperature ranges from 50° to 15° C., and is preferably from 40°-20° C., below the melting point of the thermoplastic material. When the temperature is too low, the thermoplastic fiber will eventually exhibit too high a degree of shrinkage. When the temperature is too high, the fiber will melt and adhere to the surface, so that it can no longer be unwound from the reel. The precise limits, however, depend upon the material used, and can be determined by the person skilled in the art.

The heating may last from a few minutes to a few hours, but generally lasts from 1 to 5 hours. A factor which limits the time of heating is the heat conduction in the fibers wound onto the reel. The more effective the heat conduction, the shorter the heat treatment may last. The thinner the layer of wound thermoplastic fiber, the shorter the heat treatment may last. It is possible for the reel to be heated from the inside to shorten the period of heat treatment.

In a second preferred embodiment, the heat treatment occurs in a continuous process. This is possible, for instance, by passing the thermoplastic fiber through an oven at a low tension, in which process the shrinkage equals the elongation. This process is advantageous in that the period of treatment of the fiber will be but a short time, because the fiber heats rapidly.

It is possible for the thermoplastic fibers and the reinforcing fibers to first be combined to form a hybrid bundle, and then for the entire hybrid bundle to subsequently be heated, and to keep the bundle heated for a period of time. The advantage of this process is that the tension on the hybrid bundle is less likely to produce an undesired extra elongation of the thermoplastic bundle as in, for instance, the continuous process described above. It is also possible, however, to accomplish it on a reel as described above. The handling of the fiber is facilitated by such a combination.

The thermoplastic fibers may include virtually any thermoplastic material. For its application according to the invention, however, it is important that the thermoplastic material be available in the form of a fiber. This is in principle the case with virtually all thermoplastic materials of the requisite molecular weight, but preference is given to choosing a crystalline or semi-crystalline thermoplastic material. The thermoplastic material can be selected, for instance, from polyamides (PA), such as nylon 6, nylon 6,6, nylon 4,6 (StanylR), nylon 8, nylon 6,10, nylon 11, and nylon 12; polyolefins, such as polypropylene (PP), polyethylene (PE), polytetrafluoroethylene (PTFE), and polyphenylene ether (PPE or PPO); amorphous and/or crystalline polyesters such as polyalkyleneterephthalates, such as polyethyleneterephthalate (PETP or PET), and polybutadienetereph-thalate (PBT); or polyimides (PI), such as polyetherimide (PEI), polyamideimide (PAI), polymethyl(meth)-acrylate (PMMA), and polyethylmethacrylate (PEMA). Further, polyphenylenesulphide (PPS), polyvinyl fibers, such as polyvinyl-alcohol (PVA), poly-vinylacetate (PVAc), ehtylenevinylacetate copolymer (EVA), poly-vinylchloride (PVC), polyvinylidenechloride (PVDC), copolymers of vinylchloride and vinylidenechloride or polyvinylidenefluoride (PVDF or PVF2), polyethyleneglycol (PETG), styrene-containing copolymers, such as polystyrene (PS), polymonochlorostyrene or styreneacrylonitrile copolymers (SAN), polyacrylonitrile (PAN), polyarylenesulphideketone, polyoxymethylene (POM), polycarbonate (PC), polyethers (PEth), polyetherketone (PEK), polyetherketone-ketone (PEKK), polyetheretherketone (PEEK), polyacetals, polyacrylic acid, polyurethanes (PUR), polyarylic acid (PAA), cellulose esters, polybenzimidazole (PBI), and copolymers and blends of these substances may also be used.

Preference is given to selecting the thermoplastic material from polyalkyleneterephthalates and polyamides.

Most preferably the thermoplastic material is either PETP or nylon 4,6. PETP has a melting point of 255° to 260° C. Using PETP, the heating temperature according to the present invention is therefore preferably 215°–240° C.

Fibers that can be used according to the invention will primarily be drawn during the production process. Drawn fibers are liable to shrinkage during subsequent heating steps. Undrawn fibers, for instance fibers still in an extruded phase before drawing (the so-called "undrawn yarns") can also be used according to the invention, because these undrawn yarns, too, have a certain degree of orientation as a result of the extrusion process, so that they will shrink during heating.

The orientation of the thermoplastic molecules in the fibers can be analyzed using the customary analytical techniques, such as Wide Angle X-ray (WAX) or Short Angle X-ray (SAX) analysis. As undrawn yarns are not yet stretched, they have special properties; the fibers will readily be elongated by a light pull. When using undrawn yarns, it will therefore be advantageous to combine the fibers with reinforcing fibers before their further treatment, as described above.

The term "thermoplastic fiber" as used herein denotes a continuous monofilament, a small bundle of continuous monofilaments, or a small bundle of nearly continuous filaments. Nearly continuous filaments are filaments which, once they have been gathered in a small bundle, behave as if they were a small bundle of continuous filaments. This behavior is important in the anti-shrink treatment according to the invention, and in the processing of the fiber for the formation of a fabric.

The thermoplastic monofilaments preferably have a maximum diameter of 100 μm and most preferably have a diameter of approximately 20 μm. Filaments with a thickness of greater than 100 μm are more difficult to process into a fabric.

Some commercially available fibers are coated with a protective layer. This layer may have to be removed first, for instance, by heating.

It is also possible to use mixtures of two or more thermoplastic fibers.

The reinforcing fibers can be chosen from virtually any material available in the form of a fiber provided, however, that it has a melting point higher than that of the thermoplastic material, and that in the thermoforming process the fiber shrinkage is either nonexistent, or minimal. Preference is given to using the fibers in a continuous or semi-continuous state.

The reinforcing fibers chosen may be glass, carbon, aramide, silicon carbide, aluminum oxide, asbestos, ceramics, graphite, metal, or one of the aforementioned thermoplastic materials. If the thermoplastic reinforcing fibers are selected, they must have a higher melting temperature than the thermoplastic matrix-forming fibers and, at the melting temperature of the matrix-forming thermoplastic fibers, must exhibit minimal shrinkages or only as much as the matrix-forming thermoplastic fibers. This can be achieved according to the invention by heating the higher-melting thermoplastic reinforcing fibers for some length of time at the melting temperature of the matrix-forming thermoplastic fibers. The reinforcing fibers used may be polyvinyl alcohol or polyolefin fibers with a high tensile strength and a high modulus, prepared in a gel process as described in GB-A-2.051.667 or GB-A-2.042.414. Again, a matrix-forming thermoplastic fiber must then be chosen with a melting point sufficiently below the melting point of these polyolefin fibers, such as, for instance, linear low-density polyethylene.

The fibers preferably consist of glass, carbon, or aramide. Most preferably the fibers consist of glass.

It is also possible to use mixtures of two or more types of reinforcing fiber.

Thermoplastic fibers and reinforcing fibers are processed to form a fabric by weaving or plaiting. Other processes for making fabrics are possible, but the invention is particularly advantageous when thermoplastic fibers and reinforcing fibers are parallel or virtually parallel in the fabric. The term "fabric" as used herein denotes a two-or possibly three-dimensional product built up from oriented fibers. These fibers may occur in the fabric unidirectionally (uni-directional thread as warp with an occasional woof thread), bi-directionally with different warp and woof ratios, or tri-directionally. The fabric is preferably bi-directional.

Treated thermoplastic fibers and the reinforcing fibers are preferably first brought together to form a hybrid bundle, which is then processed in a conventional manner to form a fabric. In a hybrid bundle consisting of thermoplastic fibers and reinforcing fibers, with the thermoplastic material chosen from polyalkylene terephthalates and having a certain degree of orientation, and with the reinforcing fiber chosen from the group of glass, carbon, or aramide fiber, the thermoplastic fiber exhibits a shrinkage of less than 1% when heated.

The thermoplastic fibers and/or reinforcing fibers can also be processed in the form of a so-called pregtow. This may be a twined bundle of fibers, or a bundle of fibers provided with windings of another fiber to keep the bundle together. The disadvantage of twining is the warping in the end product, with a related reduction in the mechanical or dimensional properties. Warping is the distortion caused by the twisting of the twined bundle. For this reason, preference is given to winding an extra fiber around a bundle of fibers. This can be done, for instance, by passing the bundle of fibers through a hollow, rapidly rotating reel with a thermoplastic fiber, so that an extra fiber is wound around the bundle of fibers. The extra fiber is preferably a thermoplastic fiber and is preferably heat treated. The number of windings per meter can be pre-set by choosing the feeding and rotating rates. It has been found to be advantageous if there are from 5 to 40 windings per meter. Preferably, there are from 10–20 windings per meter.

Winding an extra fiber around the hybrid bundle is advantageous, because it prevents a component fiber of the hybrid bundle from sagging by differential stress or stiffness, which would give rise to problems in the weaving process.

Reinforcing fibers can be added up to 80% by volume. Preference is given to adding from 25–80% by volume. Most preferably, from 40–60% by volume is added.

Thermoplastic powder can also be added to the fabric, or one or more layers of fabric can be combined with one or more layers of sheeting or film of the same or of a different thermoplastic material or of a thermosetting material.

In addition, fillers and conventional additives can be added, either to the thermoplastic material, before it is spun to form a fabric, or to the fabric, or to the prepreg in the thermoforming process.

The additives may be selected from, for example, pigments, fluxes, or antiblocking agents.

The fabrics of the present invention are particularly well suited to be stacked to form laminates, which are processed as prepregs under pressure in a heated mold. This may, for instance, be an ordinary double mold, or also a single mold with a vacuum bag.

The advantage of prepreg fabrics of thermoplastic fibers and reinforcing fibers over reinforcing fabrics impregnated with thermoplastic material is that the fabric can be draped when cold. This is of particular importance in the thermoforming process when filling a mold of a complex geometry, because a fabric that allows itself to be draped will conform completely to the shape of the mold.

When processing the fabric as a prepreg, the conventional processes can be applied. Typically the fabric is heated to a temperature at which the thermoplastic fibers will melt, but not yet degrade, and at which the reinforcing fibers will neither melt nor degrade. The thermoplastic fibers will generally be chosen from those thermoplastic materials that have a melting point above 100° C. and preferably above 130° C., to ensure that the mechanical properties of the product will be adequate. In order to promote the wetting of the fibers, pressure will typically be exercised, and preferably a pressure of from 5–70 bar.

At high pressures (above 100 bar), reinforcing fibers are less inclined to form loops. The process then, however, is both more difficult and expensive. The present invention is therefore particularly suited for use at processing temperatures with average to low pressures. In vacuum bag molding techniques it is possible to obtain a proper impregnation at differential pressures of 1 to 2 bar. The quality of the impregnation depends in part upon the viscosity of the thermoplastic material applied. For instance, in view of the viscosity of PETP, it is preferable to employ a pressure of from 5–50 bar when using this material.

Fabrics of thermoplastic fibers and reinforcing fibers according to the present invention can be used in all applications where the use of high-grade fiber-reinforced plastics is advantageous. The product is particularly advantageous in those areas where it is desirable for flat sheets of fabric to be subjected to elastic cold forming to conform to the mold for the thermoforming process. Examples include the automotive industry, sporting goods, domestic articles (boxes for microwaves), housings for electronic apparatus, satellite dishes, the aircraft industry, shipbuilding, home construction, furniture, vessels, and helmets.

The present invention is further illustrated by means of the following examples, without being restricted thereto.

EXAMPLES I–VI

Heat treatment

PETP fiber bundles of 17 tex (=17 g/km) were wound on a metal (heat-resistant) tube in a zig-zag pattern. The tube with the fiber bundles was heat treated in an oven for 5 hours at a temperature of 230° C.

After this treatment, the residual shrinkage of the PETP fiber bundle, when heated to its melting point (without tensile load), was less than 1%, whereas the shrinkage of non-heat-treated PETP amounted to 14%. A material having a shrinkage of 1% is technically non-shrinking, which means that such shrinkage is sufficiently below the level at which the reinforcing fibers form loops in the thermoforming process for the production of fiber-reinforced material. Hence, this fiber-reinforced material exhibits good mechanical properties, as described below.

Composition of the fiber bundles

After the heat treatment the PETP fibers were assembled with bundles of glass fiber of 17 tex to form a preg-tow. The tex number ratio of the total number of PETP bundles and the total number of glass bundles was approximately 1.5 tex glass to 1 tex PETP. That means that the glass/matrix volume ratio was approximately 50:50. The assembled hybrid bundle was approximately 300 tex.

One of the PETP bundles was wound around the hybrid bundle with approximately 10 windings per meter to keep the bundle together. This was done in the aforementioned manner. This winding process facilitated the weaving process.

Preparation of the fabric

Using these hybrid bundles a fabric was made with 90% of the bundles serving as warp and 10% as woof, that is at an angle of 90° to the warp threads (so-called 90/10 fabric). In addition, a fabric was also made with 50% warp thread and 50% woof thread (so-called 50/50 fabric). In each case the fabric width was 12 cm. The quality of the fabric was good, it contained no knots, and the surface was regular.

The fabrics produced as mentioned above were processed in the following three ways:

1. EXAMPLES I and II

A pile of 10 prepregs (Example I: 90/10; Example II: 50/50) was placed in a mold, and for 5 minutes the mold applied a pressure of 10 bar at 275° C. The mold was subsequently cooled to 150° C., opened, and the article removed. The product was 1.6 mm thick.

2. EXAMPLES III and IV

The same procedure as that in Example 1 was employed, but using an autoclave instead of a compression mold. In this vacuum technique the pressure applied was 7 bar. (Example III: 90/10; Example IV: 50/50).

3. EXAMPLES V and VI

A pile of 10 fabrics was heated outside the mold to approximately 270° C. without any pressure being applied and was then placed in the mold, which had been preheated to a temperature of 150° C. (Example V: 90/10; Example VI: 50/50). The mold was closed and a pressure of 50 bar was applied. After 2 minutes the mold was opened and the product removed. This third process is the GMT (glass mat thermoplast) process.

By applying the GMT process, short cycle times are possible. Thus, the GMT process may be the process best suited for the large-scale processing of prepregs according to the present invention.

The products resulting from each of the three processes were of the desirable product quality.

From the products, specimens were sawed using a water-cooled diamond saw, and measurements were performed. Four-point bending tests were made according to ASTM 790 M (L/D=32) and ILSS tests according to Fokker standard Part IX. For the ILSS tests, specimens were made of 20 fabrics and a thickness of 3.2 mm. Before the testing, the specimens were dried for one hour at 80° C. to remove the cooling water and were subsequently retained in an oven for 30 minutes at 150° C. (except for the specimens of the GMT process). The treatment in the oven at 150° C. increases the crystallinity of PETP and enhances the mechanical properties. The results of the tests are presented in Table 1.

COMPARATIVE EXAMPLES A AND B

PETP bundles of 17 tex, which had not been heat-treated, were assembled with bundles of glass fiber of 17 tex, using a ratio of 1.5:1, to form a hybrid bundle of approximately 300 tex.

Using this bundle a 90/10 fabric (A) and a 50/50 fabric (B) were woven. These fabrics were then dried for 1 hour at 150° C.

The fabrics were processed according to the aforementioned first process and measurements were made according to the standards described above.

The results are presented in Table 1.

TABLE I

| No. | Prepreg proc. | Fabric | E(GPa) | S(GPa) | ILSS(MPa) |
|---|---|---|---|---|---|
| I | 1. mldg process | 90/10 | 35 | 0.70 | 45 |
| A | | 90/10 | 26 | 0.24 | |
| II | | 50/50 | 23 | 0.49 | 33 |
| B | | 50/50 | 20 | 0.26 | |
| III | 2. autoclave | 90/10 | 29 | 1.09 | 48 |
| IV | | 50/50 | 20 | 0.57 | 36 |
| V | 3. GMT process | 90/10 | | not measured | |
| VI | | 50/50 | 22 | 0.40 | 31 |

E represents the modulus of elasticity and S is the breaking strength measured in the four-point bending test. The ILSS is a measure of the adhesion of the matrix to the fiber.

In a four-point bending test arrangement according to ASTM 790 M, no creep was found in respect to the 90/10 material of Example I for 1 hour at 120° C. and a tension of 0.1 GPa. The IZOD notch impact test according to ISO 180-1982 E showed a value higher than 125 KJ/m$^2$. The HDT according to ASTM D 648-82 was 256° C.

Comparing Examples I and II with comparative Examples A and B, it will be found that the heat treatment of the thermoplastic fibers before the weaving resulted in an improvement of the mechanical properties.

The invention is not limited to fibers or fiber bundles of a particular tex number.

The choice of the thickness of the bundle depends primarily upon the capacities of the loom. By choosing a thicker bundle the process may simply become more economical.

What is claimed is:

1. Fabric suitable for being processed as a thermoplastic composite prepreg, comprising thermoplastic fibers and continuous reinforcing fibers, said thermoplastic fibers having a melting point lower than that of said reinforcing fibers, with said thermoplastic fibers heated before being processed to form said fabric to a temperature of from 50° to 15° C. below the melting point of said thermoplastic material.

2. Fabric according to claim 1, wherein said thermoplastic fibers are pre-shrunk and drawn simultaneously.

3. Fabric according to claim 1, wherein said thermoplastic fibers and said reinforcing fibers are combined to form hybrid bundles, with said bundles then processed to form said fabric.

4. Fabric according to claim 3, further comprising an additional thermoplastic fiber or reinforcing fiber wound around said hybrid bundle.

5. Fabric according to claim 1, wherein said fabric consists of from 25-80% by volume reinforcing fiber and from 75-20% by volume thermoplastic fiber.

6. Fabric according to claim 1, wherein said fabric consists of from 40-60% by volume reinforcing fiber and from 60-40% by volume thermoplastic fiber.

7. Fabric according to claim 1, wherein said reinforcing fiber is chosen from the group consisting of glass, carbon, and aramide.

* * * * *